June 7, 1932.  G. A. HANDY  1,862,218
DUAL PNEUMATIC TIRE
Filed Feb. 9, 1931
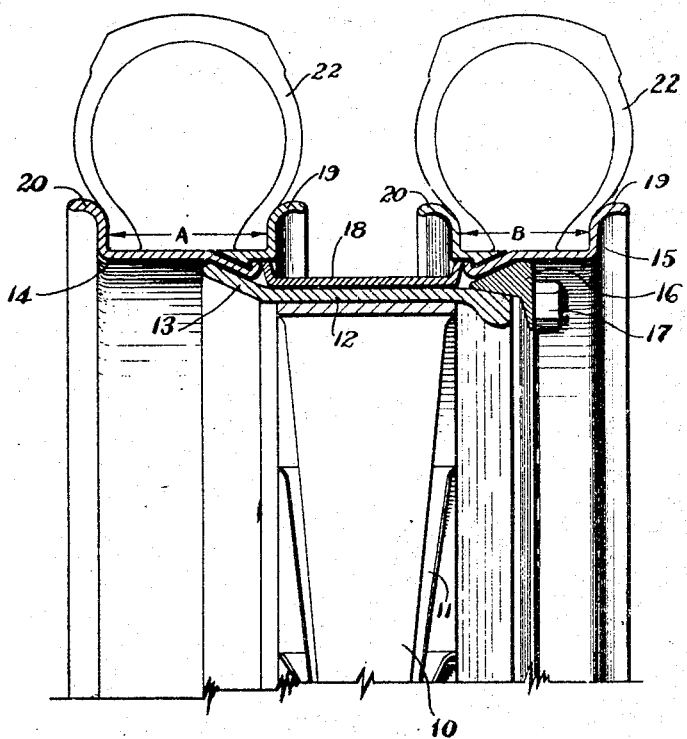

Patented June 7, 1932

1,862,218

UNITED STATES PATENT OFFICE

GEORGE A. HANDY, OF AKRON, OHIO, ASSIGNOR TO THE GOODYEAR TIRE & RUBBER COMPANY, OF AKRON, OHIO, A CORPORATION OF OHIO

DUAL PNEUMATIC TIRE

Application filed February 9, 1931. Serial No. 514,400.

The invention relates to pneumatic wheels equipped with pneumatic tires, and it has particular relation to a dual wheel wherein a pair of pneumatic tires are mounted in spaced relation.

The object of the invention is to provide a dual wheel mounting equipped with pneumatic tires, wherein the sizes of tires and rims are so related that wear on the inner tire caused by the wheel operating over crowned roads is reduced to a minimum.

Dual wheels equipped with pneumatic tires are employed largely on busses operating over pavements that are crowned for the purpose of causing water to drain from the road to the sides thereof. Ordinarily, the surfaces of the tires are disposed in the same horizontal plane, and accordingly, when the tires are operated over the pavements referred to, the tire at the lower side of the pavement is not subjected to as much wear as the tire contacting with the higher portion of the pavement. Another way of stating this fact is that the tire contacting with the higher portion of the pavement supports a greater percentage of the load, and therefore, does not last as long as the tire contacting with the lower side of the pavement. In view of these facts, tires on dual wheels which are adjacent the vehicle ordinarily fail much quicker than the outer tires. Failure of the inner tires prematurely is not desirable and it is the purpose of the invention to minimize the excessive wear on the inner tire caused by crowning of the pavement.

According to the invention, dual rims are mounted on a wheel in an ordinary manner, but the inner rim is wider than the outer rim. That is, the distance between the tire-engaging flanges on the inner rim is greater than the distance between the tire-engaging flanges on the outer rim. Tires of the same molded dimensions are mounted on both of the rims, but in view of the fact that the rims have different widths, the bead portions of the inner tire are spaced farther than the bead portions of the outer tire. This increases the air volume of the inner tire and also changes its cross-sectional contour in such manner that ordinarily the tire has a greater area of contact with the roadway. Increased road-contacting surface and increased air volume enable the tire to support a greater load without changing the load on a unit area of tire surface. Accordingly, the inner tire can support a greater load than the outer tire, although at the same time a unit area of both tires can be supporting the same load. Since the inner tire in a dual construction of this character when operating over crowned pavements necessarily must support a greater load than the outer tire, the construction described enables the inner tire to support this increased load without the excessive wear which ordinarily resulted in dual tires used previously.

Reference may be had to the accompanying drawing wherein the figure is a cross-sectional view of a dual wheel constructed according to the invention.

Referring to the figure, a wheel 10 is provided comprising a plurality of spokes 11 having a felloe 12 rigidly mounted on their outer ends. The side of the felloe adapted to be disposed next to a vehicle on which the wheel is mounted, is provided with an inclined portion 13 which supports a rim 14. The outer rim of the wheel is indicated at 15 and is supported by a wedging ring 16 seated upon the outer edge of the felloe and secured thereto by clamping bolts 17. The rims 14 and 15 are maintained in spaced relation by an annular member 18.

Each of the rims is provided with tire-engaging flanges 19 and 20. The distance between adjacent sides of the tire-engaging flanges on the rim 14 is indicated by the letter A while the distance between the tire-engaging flanges on the outer rim is indicated by the letter B. In a particular application of the invention, the rim 14 is of the 9 inch to 10 inch type, while the rim 15 is of the 8 inch type. The distance A in the 9 inch to 10 inch type of rim is approximately 7.33 inches, whereas the distance B in the 8 inch rim is 6 inches. In other words, the tire-engaging flanges in the rim 14 are spaced 7.33 inches, while the tire-engaging flanges in the rim 15 are spaced 6 inches.

On both of the rims 14 and 15, tires 22 of the same molded size are mounted, and in the particular application of the invention referred to, each tire is of the 9.75 inch type. It is apparent that the bead portions of the tire mounted on the rim 14 are spaced 1.33 inches farther than the bead portions of the tire mounted on the rim 15, because the difference between the distances A and B is 1.33 inches. Accordingly, the air volume of the tire mounted on the rim 14 is considerably larger than the air volume of the tire mounted on the rim 15. When the bead portions of a tire are moved apart, movement of the side walls of the tire occurs approximately about the median line extending circumferentially of the tread portion of the tire and more of the tread portion of the tire is moved into road-contacting positions. Consequently in the tire mounted on the rim 14, the road-contacting surface thereof is larger than the road-contacting surface of the tire mounted on the rim 15.

Since the road-contacting surface of the tire mounted on the rim 14 is increased, the unit load of this tire may be maintained substantially equal to the unit load on the tire mounted on the rim 15, notwithstanding the fact that the inner tire supports a greater load.

When the wheel is operated over crowned pavements, the inner tire necessarily must support a greater load than the outer tire. Hence, it is apparent that the invention enables the inner tire to withstand the increased load more efficiently. The life of the inner tire is increased considerably as a result of the invention.

Although only the preferred form of the invention has been described and shown in detail, it will be apparent to those skilled in the art that the invention is not so limited but that various minor modifications may be made therein without departing from the spirit of the invention or from the scope of the appended claims.

What I claim is:

1. A pneumatic tired wheel comprising a plurality of rims which vary in width between tire-engaging flanges and tires of approximately the same molded size mounted on the rims.

2. A pneumatic tired wheel comprising a plurality of rims which vary in width between tire-engaging flanges, and tires of substantially the same molded size mounted on the rims, the widest rim being on the side to be disposed nearest the vehicle.

3. A pneumatic tired wheel comprising a plurality of rims which vary in width between tire-engaging flanges, tires mounted on the rims, said tires having substantially the same radial depth but varying in distances between bead portions corresponding to the variation in distances between tire-engaging flanges on the rims.

4. A pneumatic tired wheel comprising a plurality of rims which vary in width between tire-engaging flanges, tires of substantially the same molded size mounted on the rims, said tires having substantially the same radial depth but varying in distances between bead portions corresponding to the variation in distances between tire-engaging flanges on the rims, the inner tire being disposed on the widest rim for the purpose of providing a tire of larger volume next to the vehicle.

In witness whereof, I have hereunto signed my name.

Signed at Akron, in the county of Summit and State of Ohio, U. S. A., this 31st day of January, 1931.

GEORGE A. HANDY.